US012620920B2

(12) United States Patent
Radford et al.

(10) Patent No.: US 12,620,920 B2
(45) Date of Patent: May 5, 2026

(54) SYSTEM AND METHOD FOR SHIFTING OPERATION MODES OF VARIABLE FLUX MEMORY MOTORS

(71) Applicant: Jacobi Motors, LLC, Webster, TX (US)

(72) Inventors: Nicolaus Adam Radford, Nassau Bay, TX (US); Iain Cooper, Canyon Lake, TX (US); Pierre-Olivier Gourmelon, Sugar Land, TX (US); John Parry, Richmond, TX (US)

(73) Assignee: Jacobi Motors, LLC, Webster, TX (US)

( * ) Notice: Subject to any disclaimer, the term of this patent is extended or adjusted under 35 U.S.C. 154(b) by 340 days.

(21) Appl. No.: 18/384,002

(22) Filed: Oct. 26, 2023

(65) Prior Publication Data

US 2024/0146226 A1    May 2, 2024

Related U.S. Application Data

(60) Provisional application No. 63/419,564, filed on Oct. 26, 2022.

(51) Int. Cl.
| | |
|---|---|
| *H02P 23/00* | (2016.01) |
| *H02P 5/68* | (2006.01) |
| *H02P 25/08* | (2016.01) |

(52) U.S. Cl.
CPC ............ *H02P 23/0027* (2013.01); *H02P 5/68* (2013.01); *H02P 25/08* (2013.01)

(58) Field of Classification Search
CPC ................................ H02P 25/22; B62D 5/046
See application file for complete search history.

(56) References Cited

U.S. PATENT DOCUMENTS

| | | | |
|---|---|---|---|
| 3,412,257 A | 11/1968 | Miller et al. |
| 5,925,965 A | 7/1999 | Li et al. |
| | (Continued) | | |

FOREIGN PATENT DOCUMENTS

| | | |
|---|---|---|
| CN | 101232205 A | 7/2008 |
| CN | 103683633 A | 3/2014 |
| | (Continued) | |

OTHER PUBLICATIONS

J. Huang, et al.; "Variable flux Memory Motor: A Review"; 2014 IEEE Conference and Expo Transportation Electrification Asia-Pacific, pp. 1-6; Aug. 31, 2014 (6 pages).

(Continued)

*Primary Examiner* — Zoheb S Imtiaz
(74) *Attorney, Agent, or Firm* — David L. Cohen

(57) ABSTRACT

A system for shifting operation modes of Variable Flux Memory Motor (VFMM) from external inputs includes one or more VFMMs that convert electrical power to kinetic energy, the one or more VFMMs being configured to shift to any one of a plurality of operation modes, one or more man-machine interfaces that receive one or more external inputs from a user, the one or more external inputs being indicative of a target operation mode from the plurality of operation modes selected by the user, and a controller that shifts the operation mode of the one or more VFMMs to the target operation mode based on the one or more external inputs received from the one or more man-machine interfaces.

17 Claims, 4 Drawing Sheets

(56)    References Cited

U.S. PATENT DOCUMENTS

| | | | |
|---|---|---|---|
| 6,373,162 B1 | 4/2002 | Liang et al. | |
| 6,591,925 B2 | 7/2003 | Raftari et al. | |
| 6,800,977 B1 | 10/2004 | Ostovic | |
| 6,983,897 B2 | 1/2006 | Kulovits et al. | |
| 7,592,766 B2 | 9/2009 | Patel et al. | |
| 7,597,169 B2 | 10/2009 | Borroni-Bird et al. | |
| 7,598,645 B2 | 10/2009 | Ley et al. | |
| 8,217,546 B2 | 7/2012 | Thomas | |
| 8,330,404 B2 | 12/2012 | Sakai et al. | |
| 8,860,356 B2 | 10/2014 | Yuuki et al. | |
| 8,884,576 B2 | 11/2014 | Yuuki et al. | |
| 9,054,566 B2 | 6/2015 | Woolmer | |
| 9,071,117 B2 | 6/2015 | Woolmer | |
| 9,287,755 B2 | 3/2016 | Woolmer et al. | |
| 9,306,423 B2 | 4/2016 | Jang et al. | |
| 9,496,776 B2 | 11/2016 | Woolmer et al. | |
| 9,614,417 B2 | 4/2017 | Lee | |
| 9,692,265 B2 | 6/2017 | Kato et al. | |
| 10,044,237 B2 | 8/2018 | Woolmer et al. | |
| 10,050,480 B2 | 8/2018 | Köhler et al. | |
| 10,063,180 B2 | 8/2018 | Wang et al. | |
| 10,069,385 B2 | 9/2018 | King et al. | |
| 10,069,388 B2 | 9/2018 | Court et al. | |
| 10,224,786 B2 | 3/2019 | Woolmer et al. | |
| 10,566,866 B2 | 2/2020 | Woolmer | |
| 10,608,490 B2 | 3/2020 | Woolmer et al. | |
| 10,608,512 B2 | 3/2020 | Woolmer et al. | |
| 10,630,157 B2 | 4/2020 | Mccaw | |
| 10,826,338 B2 | 11/2020 | Woolmer et al. | |
| 10,848,014 B2 | 11/2020 | Radford et al. | |
| 10,951,075 B2 | 3/2021 | Woolmer | |
| 11,035,458 B2 | 6/2021 | Vu et al. | |
| 11,078,989 B2 | 8/2021 | Yan et al. | |
| 11,146,127 B2 | 10/2021 | Vu et al. | |
| 11,211,845 B2 | 12/2021 | Yan et al. | |
| 11,303,166 B2 | 4/2022 | Yan et al. | |
| 11,342,810 B2 | 5/2022 | Woolmer | |
| 11,387,710 B2 | 7/2022 | Vansompel et al. | |
| 11,479,107 B2 | 10/2022 | Payne et al. | |
| 11,552,516 B2 | 1/2023 | Kim | |
| 11,757,383 B2 | 9/2023 | Lim et al. | |
| 11,804,354 B2 | 10/2023 | Loesch et al. | |
| 11,936,240 B2 | 3/2024 | Leijnen | |
| 11,936,256 B2 | 3/2024 | Radford et al. | |
| 12,040,668 B2 | 7/2024 | Woolmer et al. | |
| 12,057,749 B2 | 8/2024 | Hillman et al. | |
| 12,062,944 B2 | 8/2024 | Echle et al. | |
| 12,062,957 B2 | 8/2024 | Hillman et al. | |
| 12,088,182 B2 | 9/2024 | Echle et al. | |
| 12,119,709 B2 | 10/2024 | Echle et al. | |
| 2006/0170301 A1 | 8/2006 | Masuzawa et al. | |
| 2008/0292691 A1 | 11/2008 | LLoyd | |
| 2009/0261774 A1 | 10/2009 | Yuuki et al. | |
| 2010/0327787 A1 | 12/2010 | Sakai et al. | |
| 2011/0248594 A1 | 10/2011 | Thomas | |
| 2012/0217834 A1 | 8/2012 | Lutz et al. | |
| 2013/0187492 A1 | 7/2013 | Woolmer | |
| 2013/0334991 A1 | 12/2013 | Yuuki et al. | |
| 2014/0341764 A1 | 11/2014 | Müller | |
| 2014/0377101 A1 | 12/2014 | Müller | |
| 2015/0004032 A1 | 1/2015 | Müller | |
| 2015/0030479 A1 | 1/2015 | Müller | |
| 2015/0069876 A1 | 3/2015 | Jang et al. | |
| 2015/0322957 A1 | 11/2015 | Müller | |
| 2016/0344242 A1 | 11/2016 | Jang et al. | |
| 2017/0279392 A1 | 9/2017 | Fukushige et al. | |
| 2019/0173336 A1 | 6/2019 | Takeuchi et al. | |
| 2019/0207492 A1 | 7/2019 | Lin et al. | |
| 2019/0296594 A1 | 9/2019 | Nashiki | |
| 2020/0014289 A1 | 1/2020 | Ko et al. | |
| 2020/0055542 A1* | 2/2020 | Yamamoto | B62D 5/0481 |
| 2020/0195096 A1 | 6/2020 | Loesch et al. | |
| 2020/0328632 A1 | 10/2020 | Radford et al. | |
| 2020/0331517 A1* | 10/2020 | Toko | H02P 29/028 |
| 2021/0265880 A1 | 8/2021 | Shinji et al. | |
| 2021/0336519 A1 | 10/2021 | Radford et al. | |
| 2022/0006358 A1 | 1/2022 | Takahashi et al. | |
| 2022/0200423 A1 | 6/2022 | Woolmer et al. | |
| 2022/0286001 A1 | 9/2022 | Leijnen | |
| 2022/0368190 A1 | 11/2022 | Laber et al. | |
| 2022/0407374 A1 | 12/2022 | Radford et al. | |
| 2023/0014696 A1 | 1/2023 | Manke et al. | |
| 2023/0083131 A1 | 3/2023 | Choi et al. | |
| 2023/0223878 A1 | 7/2023 | Woolmer et al. | |
| 2023/0299651 A1 | 9/2023 | Kolehmainen et al. | |
| 2023/0361635 A1 | 11/2023 | Senti et al. | |
| 2023/0361646 A1 | 11/2023 | Moser | |
| 2023/0361659 A1 | 11/2023 | Kolehmainen | |
| 2023/0412057 A1 | 12/2023 | Jang et al. | |
| 2024/0014705 A1 | 1/2024 | Reh et al. | |
| 2024/0055912 A1 | 2/2024 | Kolehmainen | |
| 2024/0055921 A1 | 2/2024 | Kolehmainen | |
| 2024/0088765 A1 | 3/2024 | Leijnen | |
| 2024/0097520 A1 | 3/2024 | Wu et al. | |
| 2024/0097522 A1 | 3/2024 | Peres De Oliveira et al. | |
| 2024/0106285 A1 | 3/2024 | Lee et al. | |
| 2024/0106308 A1 | 3/2024 | Woolmer et al. | |
| 2024/0128810 A1 | 4/2024 | Hong et al. | |
| 2024/0154481 A1 | 5/2024 | Duhaut et al. | |
| 2024/0195245 A1 | 6/2024 | Odling et al. | |
| 2024/0195272 A1 | 6/2024 | Kolehmainen | |
| 2024/0204597 A1 | 6/2024 | Schmolke et al. | |
| 2024/0250565 A1 | 7/2024 | Kolehmainen | |
| 2024/0250567 A1 | 7/2024 | Horvath et al. | |
| 2024/0258846 A1 | 8/2024 | Metz | |
| 2024/0258853 A1 | 8/2024 | Steingass et al. | |
| 2024/0275248 A1 | 8/2024 | Fuchslocher et al. | |
| 2024/0284631 A1 | 8/2024 | Brinkhaus et al. | |
| 2024/0344599 A1 | 10/2024 | Schilder et al. | |
| 2024/0348134 A1 | 10/2024 | Fuchslocher et al. | |
| 2024/0351417 A1 | 10/2024 | Schilder et al. | |

FOREIGN PATENT DOCUMENTS

| | | |
|---|---|---|
| CN | 109586508 A | 4/2019 |
| CN | 110995085 B | 6/2021 |
| CN | 109586534 B | 8/2021 |
| CN | 110098717 B | 11/2021 |
| CN | 215010005 U | 12/2021 |
| CN | 112234894 B | 3/2022 |
| CN | 114337172 A | 4/2022 |
| CN | 112910130 B | 7/2022 |
| CN | 114765388 A | 7/2022 |
| CN | 114928277 A | 8/2022 |
| CN | 111756145 B | 9/2022 |
| CN | 113964981 B | 10/2022 |
| CN | 115347834 A | 11/2022 |
| CN | 112928956 B | 12/2022 |
| CN | 217984782 U | 12/2022 |
| CN | 218040947 U | 12/2022 |
| CN | 218335697 U | 1/2023 |
| CN | 109684775 B | 3/2023 |
| CN | 115864771 A | 3/2023 |
| CN | 116317248 A | 6/2023 |
| CN | 116345745 A | 6/2023 |
| CN | 113783391 B | 7/2023 |
| CN | 116526793 A | 8/2023 |
| CN | 117239969 B | 3/2024 |
| CN | 117674521 A | 3/2024 |
| CN | 117728643 A | 3/2024 |
| CN | 110739821 B | 4/2024 |
| CN | 112688526 B | 4/2024 |
| CN | 117856480 A | 4/2024 |
| CN | 117955269 A | 4/2024 |
| CN | 220929692 U | 5/2024 |
| CN | 118372627 A | 7/2024 |
| DE | 102006006824 A1 | 8/2007 |
| DE | 102014211662 A1 | 12/2015 |
| DE | 102014222121 A1 | 5/2016 |
| DE | 102014225985 A1 | 6/2016 |
| DE | 102015202988 A1 | 8/2016 |
| DE | 102015204721 A1 | 9/2016 |
| DE | 102015213678 A1 | 1/2017 |
| DE | 102016203140 A1 | 8/2017 |

(56)        References Cited

FOREIGN PATENT DOCUMENTS

| | | | |
|---|---|---|---|
| DE | 102017203306 A1 | 9/2018 |
| DE | 102017206641 A1 | 10/2018 |
| DE | 102018216967 A1 | 4/2020 |
| DE | 102020004916 A1 | 10/2020 |
| DE | 102021002939 A1 | 7/2021 |
| DE | 102021002941 A1 | 7/2021 |
| DE | 102021002966 A1 | 7/2021 |
| DE | 102020109388 A1 | 10/2021 |
| DE | 102020123345 A1 | 3/2022 |
| DE | 102022001408 A1 | 6/2022 |
| DE | 102021002466 A1 | 11/2022 |
| DE | 102022004792 A1 | 2/2023 |
| DE | 102022004794 A1 | 2/2023 |
| DE | 102022004846 A1 | 2/2023 |
| DE | 102021125982 A1 | 4/2023 |
| DE | 102021130152 A1 | 5/2023 |
| DE | 102021006602 A1 | 6/2023 |
| DE | 102022104375 B4 | 11/2023 |
| DE | 102022205515 A1 | 11/2023 |
| DE | 102022116945 A1 | 1/2024 |
| DE | 102022210416 A1 | 4/2024 |
| DE | 102022004616 A1 | 6/2024 |
| DE | 102022004618 A1 | 6/2024 |
| DE | 102022004622 A1 | 6/2024 |
| DE | 102022004793 A1 | 6/2024 |
| DE | 102023102144 A1 | 8/2024 |
| DE | 102022101633 B4 | 9/2024 |
| DE | 102023107495 A1 | 9/2024 |
| DE | 102023202494 A1 | 9/2024 |
| EP | 2133982 A2 | 12/2009 |
| EP | 2378633 A1 | 10/2011 |
| EP | 2773023 A1 | 9/2014 |
| EP | 3032718 A1 | 6/2016 |
| EP | 3091640 A1 | 11/2016 |
| EP | 2975731 B1 | 2/2018 |
| EP | 2822150 B1 | 10/2019 |
| EP | 3561999 A1 | 10/2019 |
| EP | 3929951 A1 | 12/2021 |
| EP | 3561999 B1 | 1/2024 |
| EP | 3793062 B1 | 5/2024 |
| EP | 4311078 B1 | 7/2024 |
| EP | 4404433 A1 | 7/2024 |
| EP | 4443711 A1 | 10/2024 |
| FR | 2882202 B1 | 7/2007 |
| FR | 3004025 B1 | 3/2015 |
| FR | 3006124 B1 | 5/2015 |
| FR | 3014255 B1 | 1/2016 |
| FR | 2996377 B1 | 7/2016 |
| FR | 2999359 B1 | 7/2016 |
| FR | 3023995 B1 | 8/2016 |
| FR | 3004599 B1 | 10/2016 |
| FR | 3028687 B1 | 1/2018 |
| FR | 3027468 B1 | 5/2019 |
| FR | 3059169 B1 | 8/2022 |
| FR | 3127343 A1 | 3/2023 |
| FR | 3132990 A1 | 8/2023 |
| FR | 3123264 B1 | 10/2023 |
| FR | 3143899 A1 | 6/2024 |
| FR | 3143900 A1 | 6/2024 |
| FR | 3144441 A1 | 6/2024 |
| GB | 2284104 A | 2/2011 |
| GB | 2598007 B | 3/2023 |
| GB | 2627783 A | 9/2024 |
| JP | H02223342 A | 9/1990 |
| JP | H04238005 A | 8/1992 |
| JP | H11168867 A | 6/1999 |
| JP | 2009017694 A | 1/2009 |
| JP | 4337989 A | 9/2009 |
| JP | 2010220400 A | 9/2010 |
| JP | 2013106388 A | 5/2013 |
| JP | 2013106480 A | 5/2013 |
| JP | 2014150638 A | 8/2014 |
| JP | 2014168331 A | 9/2014 |
| JP | 2017200437 A | 11/2017 |
| JP | 6524818 B2 | 6/2019 |
| JP | 6729037 B2 | 7/2020 |
| JP | 6790760 B2 | 11/2020 |
| JP | 6848390 B2 | 3/2021 |
| JP | 6917263 B2 | 8/2021 |
| JP | 6917264 B2 | 8/2021 |
| JP | 7055001 B2 | 4/2022 |
| JP | 2023121030 A | 8/2023 |
| JP | 7458699 B2 | 4/2024 |
| KR | 100580524 B1 | 5/2006 |
| KR | 20140084494 A | 7/2014 |
| KR | 101437546 B1 | 9/2014 |
| KR | 20140118197 A | 10/2014 |
| KR | 20140118203 A | 10/2014 |
| KR | 20140118204 A | 10/2014 |
| KR | 20140119302 A | 10/2014 |
| KR | 20140119304 A | 10/2014 |
| KR | 20150004065 A | 1/2015 |
| KR | 20150019028 A | 2/2015 |
| KR | 20150019057 A | 2/2015 |
| KR | 20160021532 A | 2/2016 |
| KR | 101765581 B1 | 8/2017 |
| KR | 101999860 B1 | 7/2019 |
| KR | 102299449 B1 | 9/2021 |
| KR | 10-2022-0162938 A | 12/2022 |
| KR | 20240083596 A | 6/2024 |
| KR | 20240119616 A | 8/2024 |
| WO | 2004088819 A1 | 10/2004 |
| WO | 2007093233 A1 | 8/2007 |
| WO | 2008062543 A1 | 5/2008 |
| WO | 2013002658 A2 | 1/2013 |
| WO | 2014003730 A1 | 1/2014 |
| WO | 2016005081 A1 | 1/2016 |
| WO | 2017220939 A1 | 12/2017 |
| WO | 2018188948 A1 | 10/2018 |
| WO | 2020078667 A1 | 4/2020 |
| WO | 2020210495 A1 | 10/2020 |
| WO | 2020233936 A1 | 11/2020 |
| WO | 2021081372 A1 | 4/2021 |
| WO | 2021083783 A1 | 5/2021 |
| WO | 2021083784 A1 | 5/2021 |
| WO | 2021176058 A1 | 9/2021 |
| WO | 2022023062 A1 | 2/2022 |
| WO | 2022023139 A1 | 2/2022 |
| WO | 2022023144 A1 | 2/2022 |
| WO | 2022023145 A1 | 2/2022 |
| WO | 2022023146 A1 | 2/2022 |
| WO | 2022023153 A1 | 2/2022 |
| WO | 2022023154 A1 | 2/2022 |
| WO | 2022023159 A1 | 2/2022 |
| WO | 2022023158 A2 | 3/2022 |
| WO | 2022064725 A1 | 3/2022 |
| WO | 2022064726 A1 | 3/2022 |
| WO | 2022069500 A1 | 4/2022 |
| WO | 2022128550 A1 | 6/2022 |
| WO | 2022258314 A1 | 12/2022 |
| WO | 2023001504 A1 | 1/2023 |
| WO | 2023016763 A1 | 2/2023 |
| WO | 2023020863 A1 | 2/2023 |
| WO | 2023078922 A1 | 5/2023 |
| WO | 2023094626 A1 | 6/2023 |
| WO | 2023104480 A1 | 6/2023 |
| WO | 2023104672 A1 | 6/2023 |
| WO | 2023126237 A1 | 7/2023 |
| WO | 2023126353 A1 | 7/2023 |
| WO | 2023126354 A1 | 7/2023 |
| WO | 2023135251 A1 | 7/2023 |
| WO | 2023135252 A1 | 7/2023 |
| WO | 2023165972 A1 | 9/2023 |
| WO | 2023186744 A1 | 10/2023 |
| WO | 2023186859 A1 | 10/2023 |
| WO | 2023194124 A1 | 10/2023 |
| WO | 2023198521 A1 | 10/2023 |
| WO | 2023227297 A1 | 11/2023 |
| WO | 2024003495 A1 | 1/2024 |
| WO | 2024012848 A1 | 1/2024 |
| WO | 2024022675 A1 | 2/2024 |
| WO | 2024027989 A1 | 2/2024 |
| WO | 2024028133 A1 | 2/2024 |
| WO | 2024033235 A1 | 2/2024 |

(56)                   References Cited

FOREIGN PATENT DOCUMENTS

| WO | 2024046750 | A1 | 3/2024 |
|----|-----------|----|--------|
| WO | 2024110654 | A1 | 5/2024 |
| WO | 2024120778 | A1 | 6/2024 |
| WO | 2024120977 | A1 | 6/2024 |
| WO | 2024120979 | A1 | 6/2024 |
| WO | 2024121489 | A1 | 6/2024 |
| WO | 2024132451 | A1 | 6/2024 |
| WO | 2024132599 | A1 | 6/2024 |
| WO | 2024132600 | A1 | 6/2024 |
| WO | 2024132602 | A1 | 6/2024 |
| WO | 2024141222 | A1 | 7/2024 |
| WO | 2024149678 | A1 | 7/2024 |
| WO | 2024175327 | A1 | 8/2024 |
| WO | 2024189277 | A1 | 9/2024 |
| WO | 2024199787 | A1 | 10/2024 |
| WO | 2024199815 | A1 | 10/2024 |
| WO | 2024199816 | A1 | 10/2024 |
| WO | 2024199838 | A1 | 10/2024 |
| WO | 2024213316 | A1 | 10/2024 |

OTHER PUBLICATIONS

International Search Report for corresponding International Application No. PCT/US2020/027473, mailed Aug. 17, 2020 (20 pages).
Written Opinion issued in International Application No. PCT/US2021/028869; Dated Aug. 3, 2021 (12 pages).
"Analysis of Magnetic Properties of AlNiCo and Magnetization State Estimation in Variable-Flux PMSMs", IEE Transactions on Magnetics, vol. 55, No. 7, Jul. 2019.
Xu Hai et al, "Design of a Hybrid Magnets Variable Flux Memory Machine Based on Hysteresis Model", 2019 IEEE International Electric Machines & Drives Conference (IEMDC), IEEE, May 12, 2019 (May 12, 2019), p. 1889-1894, XP033588597.

International Search Report issued in corresponding International Patent Application No. PCT/US2021/012938 dated Way 11, 2021 (4 pages).
Written Opinion issued in corresponding International Patent Application No. PCT/US2021/012938 dated May 11, 2021 (8 pages).
"Investigation of magnetization characteristics of variable flux PM based on a Fourier-fitting hysteresis model", AIP Advances 9, 095059 (2019); https://doi.org/10.1063/1.1522766.
International Search Report issued in International Application No. PCT/US2021/028869, mailed Aug. 3, 2021 (5 Pages).
International Search Report issued in PCT/US2020/057140 on Feb. 11, 2021 (4 pages).
Written Opinion of the International Searching Authority issued in PCT/US2020/057140 on Feb. 11, 2021 (11 Pages).
Athavale, A. et al.; "Enabling Driving Cycle Loss Reduction in Variable Flux PMSMs via Closed-loop Magnetization State Control"; IEEE, Oct. 1, 2017, pp. 1932-1939 (8 pages).
Desai, C.; "Back EMF, Torque-Angle, and Core Loss Characterization of a Variable-Flux Permanent-Magnet Machine"; IEEE Transactions On Transportation Electrification, vol. 5, No. 2, Jun. 1, 2019, pp. 371-384 (14 Pages).
Lee Teschkler "Innovative electric motors sport axial designs" Designworld, Feb. 6, 2019 (5 pages).
D. J. Patterson et al. "A Comparison of Radial and Axial Flux Structures in Electrical Machines" IEEE, International Electric Machines and Drives Conference; 2009 (7 pages).
T. Li et al. "Multiphysics Analysis of an Axial-Flux In-Wheel Motor With an Amorphous Alloy Stator" IEEE Access, vol. 3;Feb. 13, 2020 (12 pages).
D. Moreels et al. "This Inside-Out Motor For EVs is Power Dense and (Finally) Practical" IEEE Spectrum; Sep. 30, 2019 (8 pages).
Daan Moreels "Axial Flux vs Radial Flux: 4 Reasons Why Axial Flux Machines have a Higher Power Density" Magnax; Jan. 31, 2018 (6 pages).

* cited by examiner

200

300

400A

| PROVIDING ONE OR MORE VFMM CONNECTED TO A CONTROLLER | 402 |

| RECEIVING SIGNALS TO SHIFT OPERATION MODE | 404 |

| DETERMINING MAGNETIZATION STATES OF THE ONE OR MORE VFMM CORRESPONDING TO TARGET MODE | 406 |

| TRANSMITTING A SET OF COMMAND SIGNALS TO THE ONE OR MORE VFMM | 408 |

400B

1

SYSTEM AND METHOD FOR SHIFTING OPERATION MODES OF VARIABLE FLUX MEMORY MOTORS

CROSS REFERENCE TO RELATED APPLICATIONS

This application claims priority, pursuant to 35 U.S.C. § 119(e), to U.S. Provisional Application No. 63/419,564 entitled, "METHOD, SYSTEM, AND APPARATUS TO IMPROVE DRIVER EXPERIENCE," filed on Oct. 26, 2022. The contents of which are hereby incorporated by reference in its entirety.

BACKGROUND

Synchronous electric motors with permanent magnets such as Variable-Flux Memory Motors (VFMM) have a wide range of applications in industrial, commercial, and residential, applications, such as fans, pumps, compressors, elevators, and refrigerators, industrial machinery, and electric motor vehicles because of their high efficiencies. These advantages along with others (e.g., being brushless) make the synchronous electric motors popular where high torque, high efficiency, or low maintenance for electric motors is needed.

The versatility of applications of such synchronous electric motors can be further exploited with real-time or near real-time shifting of operation modes thereof. For instance, particularly in automobile applications, configurations of the synchronous motors may be suitably adapted based on performance requirements, such as requiring high-torque and low-speed during acceleration, and requiring low-torque high speed when cruising on a freeway. While synchronous electric motors provide increased efficiency in a wide band of operating ranges, existing solutions fail to provide means for switching operation modes thereof. Existing solutions also fail to address appropriate techniques of compensating, and thereby preventing, loss in performance of the synchronous motors during shifting of operation modes. Additionally, existing solutions also are incapable of shifting operation modes thereof based on external inputs from human operators or sensory information of the environment around the automobile.

Therefore, there is a need for a system and a method for shifting operation modes of VFMM. Particularly, there is a need for a system and a method for shifting operation modes of VFMMs based on external inputs.

SUMMARY

In an aspect of the disclosure, embodiments of the disclosure are directed towards a system for shifting operation modes of Variable Flux Memory Motor (VFMM) from external inputs. The system includes one or more VFMMs that convert electrical power to kinetic energy, the one or more VFMMs being configured to shift to any one of a plurality of operation modes, one or more man-machine interfaces that receive one or more external inputs from a user, the one or more external inputs being indicative of a target operation mode from the plurality of operation modes selected by the user, and a controller that shifts the operation mode of the one or more VFMMs to the target operation mode based on the one or more external inputs received from the one or more man-machine interfaces.

In another aspect, embodiments of the disclosure are directed towards a system for shifting operation modes of variable flux memory motor (VFMM) based on environmental parameters. The system includes one or more VFMMs that convert electrical power to kinetic energy, the one or more VFMMs being configured to shift to any one of a plurality of operation modes, one or more sensors that detect one or more environmental parameters, and a controller that shifts the operation mode of the one or more VFMMs to a target operation mode based on the one or more environmental parameters received from the one or more sensors.

In yet another aspect, embodiments of the disclosure are directed towards method for shifting operation mode of Variable Flux Memory Motor (VFMM), comprising: providing one or more VFMMs connected to a controller that operably shifts an operation mode of the one or more VFMMs based on an external signal, receiving, by the controller, a set of signals from either one or more man-made interfaces or one or more sensors to shift a target operation mode of the one or more VFMM, determining, by the controller, a set of magnetization states of each VFMMs from the one or more VFMMs corresponding to the target operation mode, and transmitting, by the controller, a set of command signals to each VFMMs from the one or more VFMMs to shift the operation mode thereof.

Other aspects of the disclosure will be apparent from the following description and the appended claims.

DETAILED DESCRIPTION

Figure 1:
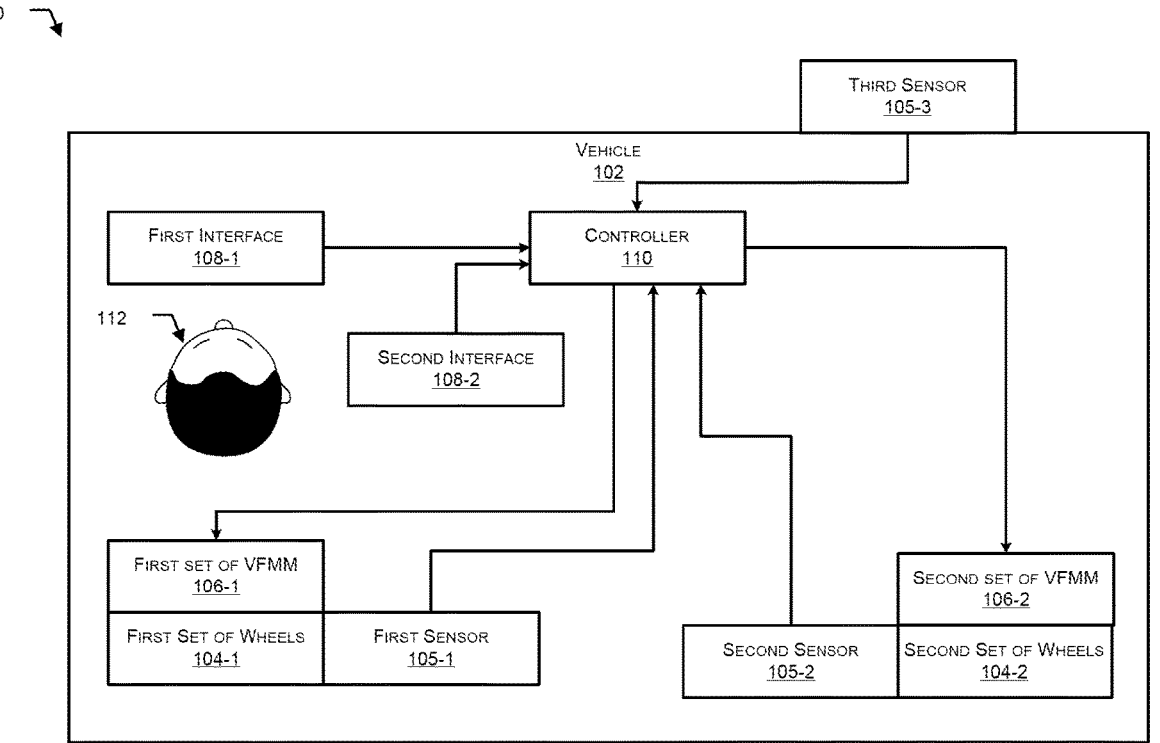
FIG. 1 shows a block diagram of a system for shifting operational modes of a Variable Flux Memory Motor (VFMM) implemented in a vehicle, according to one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it would have been apparent to one of ordinary skill in the art that the disclosure may be practiced without these specific details. In other instances, well-known features have not been described in detail to avoid unnecessarily complicating the description.

Variable Flux Memory Motor (VFMM) have been of particular interest in the art. VFMMs have provided maximized efficiency of electric motors over a broad range of torques and speeds. While VFMMs have maximum efficiency at nearly all operating ranges, VFMMs are generally configured to a predetermined operation mode and provide a predetermined torque and speed based on the requirement. To shift operation modes of the VFMM, control systems are required that appropriately magnetize the VFMMs to provide specifically desired range of the torque-speed regime whilst maintaining maximum efficiency. Particularly, control systems are required to operably shift between operation modes of the VFMMs available to a user, thereby exploiting the versatility of VFMM. VFMMs may find several applications in electric vehicles and other transportation modes due its versatility. Other properties of operable VFMMs include reduced cost of manufacturing due to use of non-rare earth magnets, reduced weight, reversibly magnetizable property allowing for easier assembly, easier maintainability and repair, among others, thereby improving driver and vehicle ownership experience.

Referring to FIG. 1, a block diagram of a system (100) for shifting operational modes of one or more VFMMs implemented in a vehicle (102) us illustrated. As shown, the system (100) may include one or more man-machine interfaces, such as first interface (108-1) and second interface (108-2) (collectively referred to as the interfaces (108)) through which a user (112) provides one or more external inputs to the system (100). In some embodiments, the system (100) may include one or more sensors, such as first sensor (105-1), second sensor (105-2), and third sensor (105-3) (collectively referred to as the sensors (105)). The system (100) includes one or more of the VFMMs, such as first set of VFMMs (106-1) and second set of VFMMs (106-2) (collectively referred to as the VFMMs (106)), each being configured to a corresponding set of wheels, such as first set of wheels (104-1) and second set of wheels (104-2) respectively (collectively referred to as the set of wheels (104). Further, the system (100) may include a controller (110) that shifts the operation mode of the VFMMs (106) to a target operation mode from a plurality of operation modes of the VFMMs (106) based on one or more external inputs received from the interfaces (108), or the sensors (105), or both. While the present disclosure is described in the context of the system (100) being adapted for automotive implementations, it may be appreciated by those skilled in the art that the system (100) may be suitably adapted other non-automotive applications.

In one or more embodiments, the vehicle (102) may include, but not be limited to, a combustion engine vehicle, electric vehicle, hybrid vehicle, and the like. Examples of the vehicle (102) include, but not be limited to, two-wheelers, three-wheelers, cars, vans, trucks, buses, hydraulic vehicles, electric trains, locomotives, boats, ships, and the like. The vehicle (102) may include one or more components configured to provide one or more functionalities. In some embodiments, the components may be selected from a group including, but not limited to, an e-drive motor, staters of a combustion engine, a thermal heater, e-axles, inverters, exhaust pipes, batteries, chargers, compressors, direct current (DC) to DC converters, variable frequency drive, and fuel cells associated with the vehicle (102). In some embodiments, the components may be powered by electricity. The VFMMs (106) and the wheels (104) may also be components of the vehicle (102), in some embodiments. However, it may be appreciated by those skilled in the art that the system (100) may be implemented in any electrical system for requiring a motor whose operation modes may be operably shifted.

In one or more embodiments, the VFMMs (106) may be indicative of synchronous electric motors whose flux linkage (k m) may be dynamically, and operably, adjustable. The VFMMs (106) may be a type of synchronous motor in which magnetization of rotor magnets of the VFMMs may be adjusted (i.e., changed) during an operation of the VFMMs (106). The adjustment of the magnetization of the rotor magnets (hereinafter, will be referred to as "VFMM magnetization" or "magnetization state" for simplicity) changes the Rotations Per Minute (RPM) speed and torque provided by the VFMMs (106) for a given supply of power. According to one or more embodiments, to facilitate the change in the magnetization state of the VFMMs (106), the rotor magnets thereof are made of a soft-ferromagnetic material such as aluminum nickel cobalt (AlNiCo) or some types of ceramic. Hereinafter, the rotor magnets made of a soft-ferromagnetic material will be referred to as "soft magnets." The soft magnets are Low Coercive Force Magnets (LCF). According to one or more embodiments, the soft magnets may be AlNiCo with grades 1-9 or magnets made of AlNiCo, cast, ceramics, some grades of samarium cobalt, or sintered construction of these materials. It is apparent that one of ordinary skill in the art could use specific amounts of these materials to achieve a desired function of the VFMMs (106). The design, construction, number, and arrangements of a stator, the rotor, and the soft magnets may the VFMMs (106) may be suitably adapted based on requirements of the use cases. In some examples, the VFMMs (106) may correspond to those provided in patent specifications WO2020210495A1, US20220407374A1, and/or WO2021081372A1.

The VFMMs (106), in accordance with one or more embodiments, is a better substitute to a conventional synchronous motor because a maximum achievable RPM with a limited bus voltage of the VFMMs (106) may be more efficiently attained through changing the magnetization states thereof. In other words, the constant power speed range (CPSR) of the VFMMs (106) could have a wider range compared to the CPSR of the synchronous motor.

In one or more embodiments, the soft magnets can be quickly and efficiently magnetized and demagnetized while the soft magnets are assembled inside the motor. Accordingly, using VFMMs (106) potentially reduces manufacturing costs of electric motor-equipped systems due to being magnetized or demagnetized during assembly.

In one or more embodiments, the magnetization states of the soft magnets may be changed to any value from 0% magnetization (i.e., the soft magnets are completely demagnetized) to 100% magnetization (i.e., the soft magnets are magnetized to their maximum capacity). The change in the magnetization states may occur in a short time (e.g., about 1 millisecond). In one or more embodiments, the magnetization states of the VFMMs (106) may be changed by passing a pulse of current therethrough such that the soft magnets are magnetized or de-magnetized up to the desired level of magnetization. At each magnetization state, the each of the VFMMs (106) may provide a unique profile of torque and speed.

In one or more embodiments, the VFMMs (106) may be operably shifted between any of a plurality of operation modes. The operation modes of the VFMMs (106) may correspond to the torque and speed profiles of each of the VFMMs (106). Each operation mode in the plurality of operation modes corresponds to a unique combination of magnetization states of each of the VFMMs (106). In some embodiments, the operation mode of the VFMMs (106) may be changed based on the magnetization state of each of the VFMMs (106).

Figure 3:
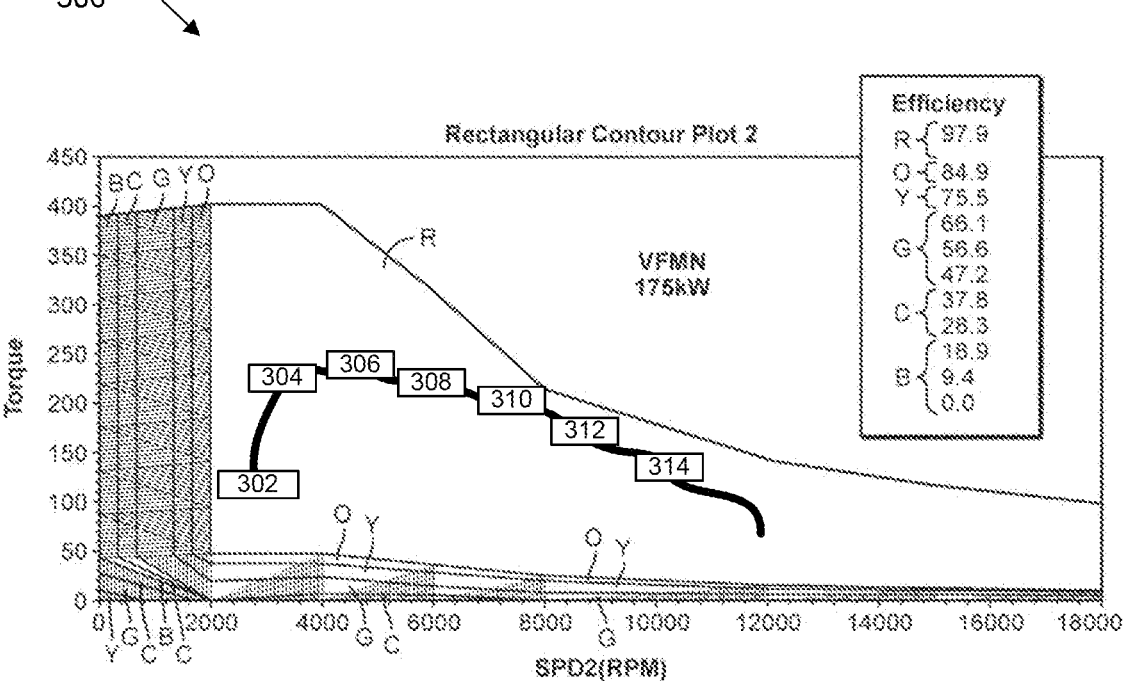
FIG. 3 shows an efficiency map of a VFMM, according to one or more embodiments.

In some embodiments, the operation mode may correspond to at least one point within the efficiency map of the VFMMs (106), as shown in FIG. 3. In some examples, points (302) to (314) indicate the operation modes of the VFMMs (106) available to the user (112). The operation modes available for the VFMMs (106) on the efficiency map may be suitably selected based on the weight, type and performance requirements of the implementation, such as those of the vehicle (102) in automotive implementations.

In some examples, a first set of VFMMs (106-1) from the VFMMs (106) may be associated with rear wheels of the vehicle (102), and a second set of VFMMs (106-2) may be associated with the front wheels of the vehicle (102). In such examples, a first operation mode (302), as shown in FIG. 3, indicative of a "crawling mode" where the first and the second set of VFMMs (106-2) may provide low-torque and low-speed. Further, the user (112) may shift the VFMMs (106) to a second operation mode (404) indicative of a "climbing mode" where the magnetization state of the first set of VFMMs (106-1) may switched to provide high-torque and low-speed such that the front wheels allow the vehicle (102) to climb an inclined road without risking the vehicle (102) from tipping over. Additionally, the user (112) may shift to a third operation mode (414) where the magnetization state of the first and second sets of VFMMs (106-1, 106-2) may provide low-torque and high-speed corresponding to the power supplied thereto. The third operation mode (414) may be preferred for driving on freeways.

In one or more embodiments, at least one operation mode may configure each of the VFMMs (106) to have the same magnetization state. In other embodiments, at least one operation mode may configure the first set of VFMMs (106-1) to have different magnetization states from the second set of VFMMs (106-2). In some examples, the first set of VFMMs (106-1) associated with rear wheels of the vehicle (102) may be configured to have lower torque in comparison to the second set of VFMMs (106-2) associated with front wheels of the vehicle (102) during acceleration. In other automotive examples, the plurality of operation modes may include at least one operation mode for providing functionalities including, but not limited to, limited slip differential embodiment, anti-skid, differential torque based on weight distribution of the vehicle (102) such as providing differential torque to wheels at the front, rear, or sides of the vehicle (102) based on load put thereover (such as in trucks), differential torque due to weight distribution changes from inclination of surface, and the like.

In other non-automotive examples, the VFMMs (106) associated with an air circulation system. The magnetization state of each of such VFMMs (106) may be different to optimize the air circulation functionality thereof. For instance, where a first fan and a second fan of the air circulation system are configured in an array, the first fan may be configured to have higher torque but lower speed of rotation compared to the second fan which may have lower torque but higher speed of rotation, thereby allowing air to be circulated efficiently, and at higher speeds.

In one or more embodiments, the first VFMMs (106-1) may be configured to the first set of wheels (104-1) and the second VFMMs (106-2) may be configured to the second set of wheels (104-2). In some embodiments, the VFMMs (106) may be configured directly to the corresponding wheels (104). In other embodiments, the VFMMs (106) may be connected to the set of wheels (104) through a transmission or an axle. In such embodiments, each VFMMs (106) may provide power to one or more of the wheels (104). In such embodiments, the VFMMs (106) may provide the same torque and speed for each wheel connected thereto through the axle.

In one or more embodiments, the interfaces (108) may be configured to receive one or more external inputs from a user (112). The external inputs may be indicative of a target operation mode from the plurality of operation modes selected by the user (112). In one or more embodiments, the interfaces (108) may be connected to the controller (110) to operably change the operation mode of the VFMMs (106). In some embodiments, the controller (110) may be coupled to the man-machine interfaces. The man-machine interface may be connected by a set of electrically conductive materials, including, but not limited to, wires, cables, bus bars, and the like.

Each of the interfaces (108) may any one or combination of including, but not limited to, a shift knob, a button, a grip shift, a foot pedal, a rotary knob, a voice command receiver, and biomedical implants, that enable the user (112) to indicate the target operation mode. In one or more embodiments, the user (112) may select the target operation mode by interacting with the interfaces (108). Such interfaces (108) may provide haptic feedback to the user (112) during operation, thereby allowing the users (112) to have an engaging driving experience. In some examples, the first interface (108-1) may be indicative of a rotary knob or a steering, and the second interface (108-2) may be indicative of a shift knob. In such examples, the user (112) may explicitly indicate the operation mode to which the VFMMs (106) are to be shifted, such as by moving the shift knob from a first position indicative of a fourth operation mode (such as a "cruising mode") to a second position indicative of a fifth operation mode (such as a "sporting mode").

In one or more embodiments, the controller (110) may determine the target operation mode selected by the user (112) based on the one or more external inputs received from each of the interfaces (108). In such embodiments, the controller (110) may infer the target operation mode based on the state of each of the interfaces (108). In some examples, the controller (110) may determine that target operation mode to be indicative of a sixth operation mode (such as an "climbing mode") if the shift knob is in a position indicating user (112)'s need for higher torque, and if the user (112) depresses the foot pedal beyond a predetermined limit when the user (112) wishes to scale an inclined surface.

In one or more embodiments, the controller (110) may include a processor (e.g., a CPU) coupled to a memory (e.g., a RAM). The memory may have one or more processor-executable instructions for shifting operation modes of the VFMMs (106).

In one or more embodiments, on receiving the one or more external inputs, the controller (110) may retrieve, from a database coupled to the controller (110), a set of magnetization states for the VFMMs (106) corresponding to the target operation mode. In such embodiments, the database may include the corresponding set of magnetization states for each operation mode of the VFMMs (106). The corresponding set of magnetization states may be predetermined using techniques such as Finite Element Analysis (FEA), but not limited thereto. In such embodiments, the FEA may be performed using the geometry and design of the VFMMs (106), and using the external inputs as boundary conditions to determine the set of magnetization states. The determined magnetization states may be stored in the database. In other embodiments, the set of magnetization states may be inferred from the corresponding efficiency map. The controller (110) may transmit a command signal to the VFMMs (106) to switch magnetization states thereof to the retrieved set of magnetization states. In some embodiments, the controller (110) may transmit the command signal to each of the VFMMs (106) to individually switch the magnetization states thereof. In some embodiments, the command signal may be indicative of a pulse of electric current.

In one or more embodiments, on receiving the one or more external inputs, the controller (110) may determine the set of magnetization states corresponding to the target operation mode in real-time for each VFMMs from the VFMMs (106) based on the one or more external inputs. The set of magnetization states may be determined in real-time using FEA. The controller (110) may transmit the command signal to the VFMMs (106) to switch magnetization states thereof to the determined set of magnetization states.

In one or more embodiments, the controller (110) may transmit the set of command signals indicative of pulses of current to the VFMMs (106) to switch magnetization states thereof. The length and strength of the pulse may be customizable by the user (112) to correspondingly adjust the duration of magnetization of the VFMMs (106). In some embodiments, the pulse is transmitted in shorter lengths and greater strength, the duration of for magnetizing the VFMMs (106) may be reduced, compared to when the pulse is transmitted in greater lengths and lower strengths. The duration of magnetizing the VFMMs (106) may allow users (112) to adjust the harshness or softness of shifts. The duration of magnetizing the VFMMs (106) may be suitably adjusted based on comfort and performance requirements of the user (112). In some embodiments, the controller (110) may alter the shifting feel of the vehicle (102) to mimic the shifting feel of other vehicles, such as those of famous or historical cars. This ability may be used for general user enjoyment, or to control conditions in a competition, such as racing with any such vehicle as might be used for the application. In some embodiments, optimization algorithms may be used to determine the set of magnetization states based on one or more boundary conditions, such as the length and the strength of the pulse, associated with the requirement.

In other embodiments, duration of transitioning of the magnetization states may also be adapted based on the external inputs and the environmental variables. In some examples, when the sensors (105) detect that the surface is slippery, such as when the wheels (104) are on ice, snow, water and grass, or when the wheels (104) are on sand, mud ruts, gravel, hill ascent and descent, the controller (110) may change the magnetization states of the VFMMs (106) such that the torque output is gradually increased during startup. In such embodiments, the controller (110) may incrementally increase the magnitude of the pulse transmitted into the VFMMs (106) to magnetize the soft magnets thereof.

Figure 2:
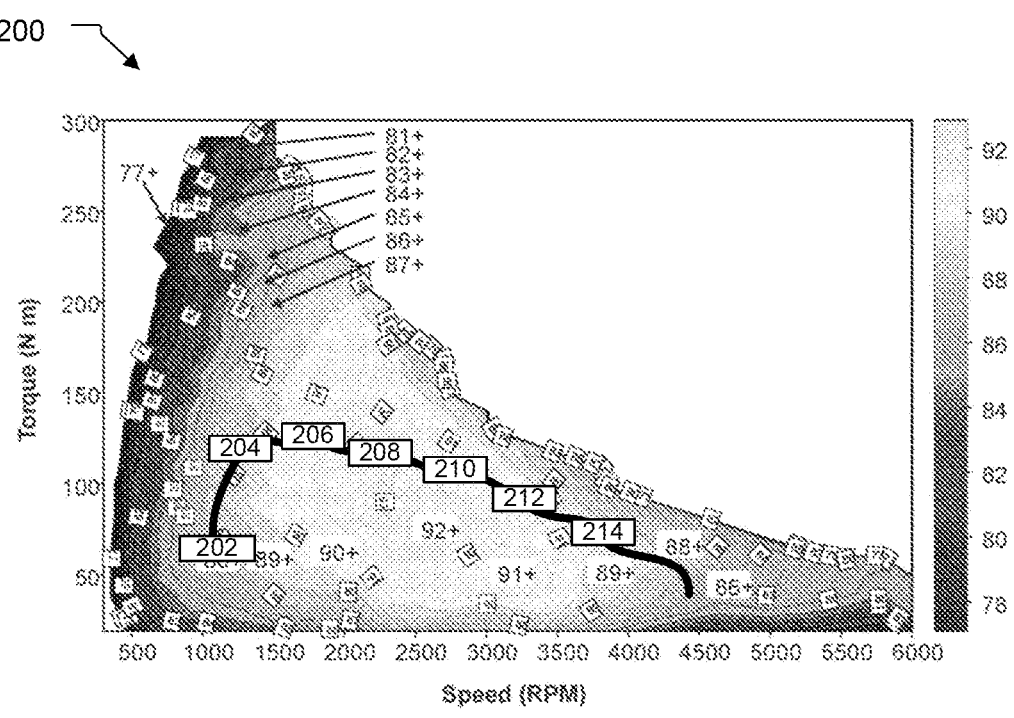
FIG. 2 shows an efficiency map of a conventional motor.

FIG. 2 shows an efficiency map (200) of a conventional motor, and FIG. 3 shows an efficiency map (300) of the VFMMs (106). In both FIGS., a plurality of points, such as points (202 to 214) and points (302 to 314), indicative of the operation modes of the conventional motor and the VFMMs (106), respectively, are shown. The efficiency maps may be generated using techniques including, but not limited to, FEA, machine learning, regression analysis, and the like. The efficiency maps may be generated using a combination of real-world values and estimated values. These maps allow for a visual representation of how the motor or VFMMs (106) will perform under various operation modes and environmental conditions. As shown, efficiencies of 90% and higher are localized to a small region of the operating range of the motor. Further, not all points/operation modes selected from the region having 90% efficiency. The VFMMs (106), however, may enable a broader high-efficiency operating range as the VFMMs (106) consistently provide efficiency greater than 97.5 at nearly the entire operating range. Hence, the VFMMs (106) may allow maximum efficiency at all points on the efficiency map, and by implication at all operation modes.

In one or more embodiments, the efficiency map may be pre-computed and stored in the database. Further, a set of points (302 to 314) may be selected and provided as the operation modes available to the user (112). In some examples, each of the points (302 to 314) may correspond to transmission levels, which provides decremental torque and incremental speed from point (304) to point (314). The controller (110), in such embodiments, may retrieve the appropriate operation mode/point based on the external inputs, the environmental parameters, or both. In other embodiments, the controller (110) may be configured to determine a point on the efficiency map based on a function of the external inputs, the environmental parameters, or both. In such embodiments, the points/operation modes available to the user (112) may not be limited to the points (302 to 314), and may be determined in real-time. Such embodiments may particularly find applications where performance is of utmost importance, such as in automotive racing.

In one or more embodiments, the controller (110) may be configured to synchronously shift the magnetization states of the each of the VFMMs (106). However, the VFMMs (106), in such embodiments, may cause a temporary loss in power output during shifting of operation modes, or specifically during re-magnetization of the VFMMs (106). In such examples, the first set of VFMMs (106-1) associated with the rear wheels, and the second set of VFMMs (106-2) associated with the front wheels of the vehicle (102), may provide substantially equal power output to move the vehicle (102) at about 50 mph. When the user provides external inputs to the controller (110) to accelerate the vehicle (102), the controller (110) may transmit the first command signal to the first set of VFMMs (106-1) to shift to the magnetization state thereof that provides increased power output corresponding to the desired acceleration of requirements of the user. However, the first set of VFMMs may experience a temporary drop in the power output when shifting to the first magnetization state. To compensate for the loss in power output, the controller (110) may transmit the second command signal to the second set of VFMMs (106-2) to increase power supplied thereto for maintaining the power output. In such embodiments, the controller (110) may be configured to asynchronously shift the operation modes of the VFMMs (106).

In one or more embodiments, the controller (110) may transmit a third command signal to the second set of VFMMs (106-2) to switch magnetization states thereof corresponding to the target operation mode. The controller (110) may transmit a fourth command signal to the first set of VFMMs (106-1) to increase power supplied thereto to compensate for decrease in net power output of the VFMMs (106) during switching of the magnetization states of the second set of VFMMs (106-2). In such embodiments, the system (100) may avoid having temporary losses in power during shifting of magnetization states of the VFMMs (106).

While the foregoing example describes a scenario where the one or more VFMMs (106) are controlled asynchronously, and the one or more external inputs indicate requirement for increasing the power output of the VFMMs (106), it may be appreciated by those skilled in the art that the controller (110) may be suitably adapted to asynchronously control the VFMMs (106) for decreasing the power output thereof.

In one or more embodiments, the system (100) may include a display (not shown) to display or indicate the operation mode of the one or more VFMM, and torque and speed provided by each VFMMs from the one or more VFMMs in the target operation mode. In some embodiments, the display may be any one of including, but not limited to, display monitors such as a Liquid Crystal Display (LCD), speedometers, Light-Emitting Diode (LED), and the like. In some embodiments, the display may provide statistics and other information to the user on the state of the motor, including, but not limited to, motor speed (usually in RPM), operation mode, mode, shift lights, efficiency gauge, as well as VFMMs specific values, such as percentage of maximum available armature voltage (Vs), or actual Vs value, any unit used to display current state of motor, gauge for magnetization state percentage (gear).

In another aspect, the system (100) may shift the operation modes of the VFMMs (106) based on one or more environmental parameters received from the sensors (105). In one or more embodiments, the sensors (105) may be configured to detect one or more environmental parameters. In such embodiments, the controller (110) may shift the operation mode of the VFMMs to the target operation mode based on the one or more environmental parameters received from the sensors (105).

In one or more embodiments, each of the sensors (105) configured to detect the one or more environmental parameters. The environmental parameters may be any one or combinations of including, but not limited to, rain detection parameters, surface friction parameters, temperature parameters, tire pressure parameters, surface gradient parameters, and the like. In such embodiments, the system (100) may include corresponding sensors (105) to detect each of the environmental parameters. In some examples, the sensors (105) may include a rain sensor to detect the rain detection parameter, a traction sensor to detect the surface friction parameters, a temperature sensor to detect ambient temperatures and temperatures of one or more components of the vehicle (102), a pressure sensor to detect the tire pressures, a weight sensor to determine distribution of weight to infer the surface gradient parameters, and other sensors to detect the one or more environmental parameters. The controller (110) may determine the target operation mode based on comparing the one or more environmental parameters received from each of the one or more sensors with corresponding predetermined thresholds.

In certain embodiments, the predetermined thresholds may be pre-configured based on manufacturer specifications, industry standards, or personalized user preferences. For example, if the rain sensor detects precipitation, the controller (110) may shift the operation mode to a wet weather operation mode, thereby adjusting the vehicle's systems for improved safety and performance under these conditions.

Further, at least one of the sensors (105) may be a Light Detection and Ranging (LIDAR) sensor that detects the one or more environmental parameters indicative of 3-Dimensional (3D)-scans of an environment around the vehicle (102). In such embodiments, the controller (110) may determine the target operation mode based on the 3D-scans of the environment. Such embodiments may find applications in autonomous driving, where speed of rotation of the VFMMs (106) may be varied while maintaining optimal motor efficiency, and thereby also extending the lifespan of a battery of the vehicle (102).

In one or more embodiments, the system (100) may also include the interface (108) in addition to the sensors (105). In such embodiments, the controller (110) may determine the target operation mode based on the one or more external inputs received by the interfaces (108) from the user (112), and the one or more environmental parameters provided by the sensors (105). In some embodiments, the controller may be configured to determine the user's desired performance from the vehicle through the man-machine interfaces. The controller may receive the environmental parameters and determine the target operation mode for meeting the user's desired performance, while using the environmental parameters are boundary/operating conditions. In an example, the controller (110) may receive the external input indicative of the user's desire to accelerate, and may receive the environmental parameters, such as an affirmation signal from a rain sensor. The controller (110) may, based on the external inputs and the environmental parameters, retrieve the target operating mode for the VFMMs (106), such as an operation mode where the first set of VFMMs (106-1) having greater traction than a second set of VFMMs (106-2) is configured to provide greater torque, and in turn desired acceleration, on wet surfaces. In other examples, the user (112) may use the interface (108) to manually override the operation mode selected by the controller (110) based on the environmental parameters. The manual override feature allows the vehicle (102) to cater to unique driving styles and preference of different users (112). In yet other examples, the controller (110) may be configured to prevent the user (112) to enter to "sport operation mode," when the traction of the wheels (104) with the surface is below a predetermined threshold, such as when the surface is wet, or icy, thereby providing a safety feature for the user (112). In some embodiments, the controller (110) may be configured to severally adjust the magnetization states of the VFMMs (106) based on the environmental parameters. In some examples, if one of the wheels is stuck in a pothole, the controller (110) may cease power supply to said wheel, and redirect power to other wheels to provide compensatory torque. Operation of the controller (110) in such examples may also be used for providing limited slip differential to the vehicle (102).

In some embodiments, each of the sensors (105) may be configured to a corresponding wheel from the wheels (104). As shown in FIG. 1, the first sensor (105-1) may be configured to the first set of wheels (104-1) and the second sensor (105-2) may be configured to the second set of wheels (104-2). In some embodiments, the third sensor (105-3), such a LIDAR sensor, may be configured outside the vehicle (102) to scan the environment around said vehicle (102).

Figure 4A:
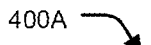
FIG. 4A shows a flowchart of a method for shifting operation modes of VFMM, according to one or more embodiments.
Figure 4A:
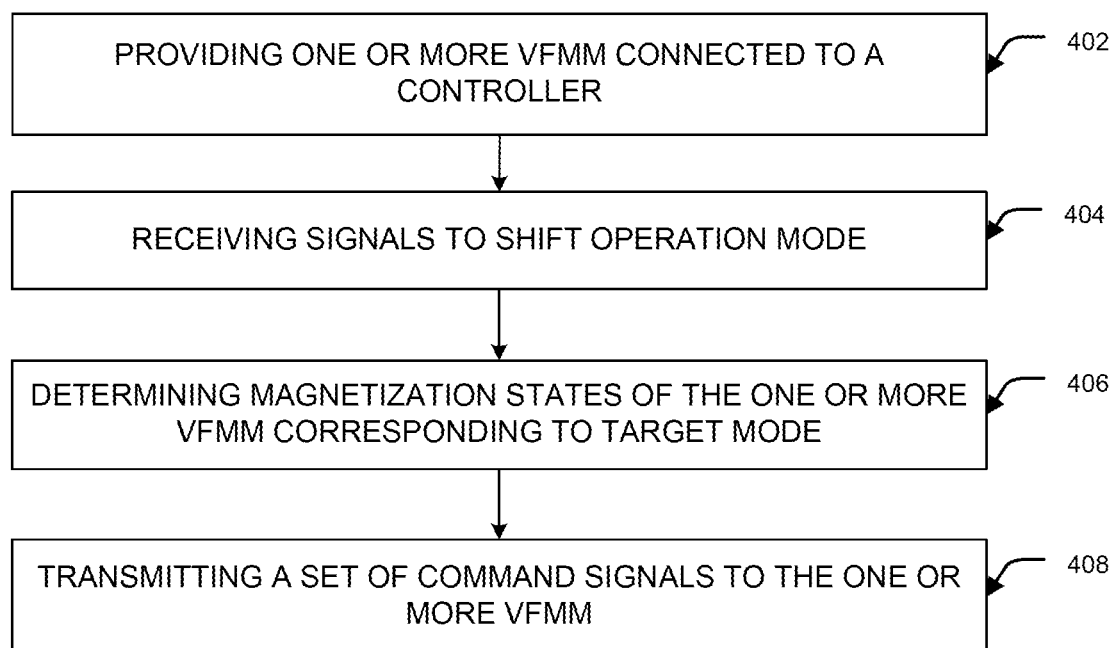

FIG. 4A shows a flowchart of a method (400A) for shifting operation modes of VFMMs (106), according to one or more embodiments.

At step 402, the method (400A) includes providing one or more VFMMs connected to a controller that operably shifts an operation mode of the one or more VFMMs based on one or more external signals.

At step 404, the method (400A) includes receiving, by the controller, a set of signals from either one or more man-made interfaces or one or more sensors to shift a target operation mode of the one or more VFMM.

At step 406, the method (400A) includes determining, by the controller, a set of magnetization states of each VFMMs from the one or more VFMMs corresponding to the target operation mode. And At step 408, the method (400A) includes transmitting, by the controller, a set of command signals to each VFMMs from the one or more VFMMs to shift the operation mode thereof.

Figure 4B:
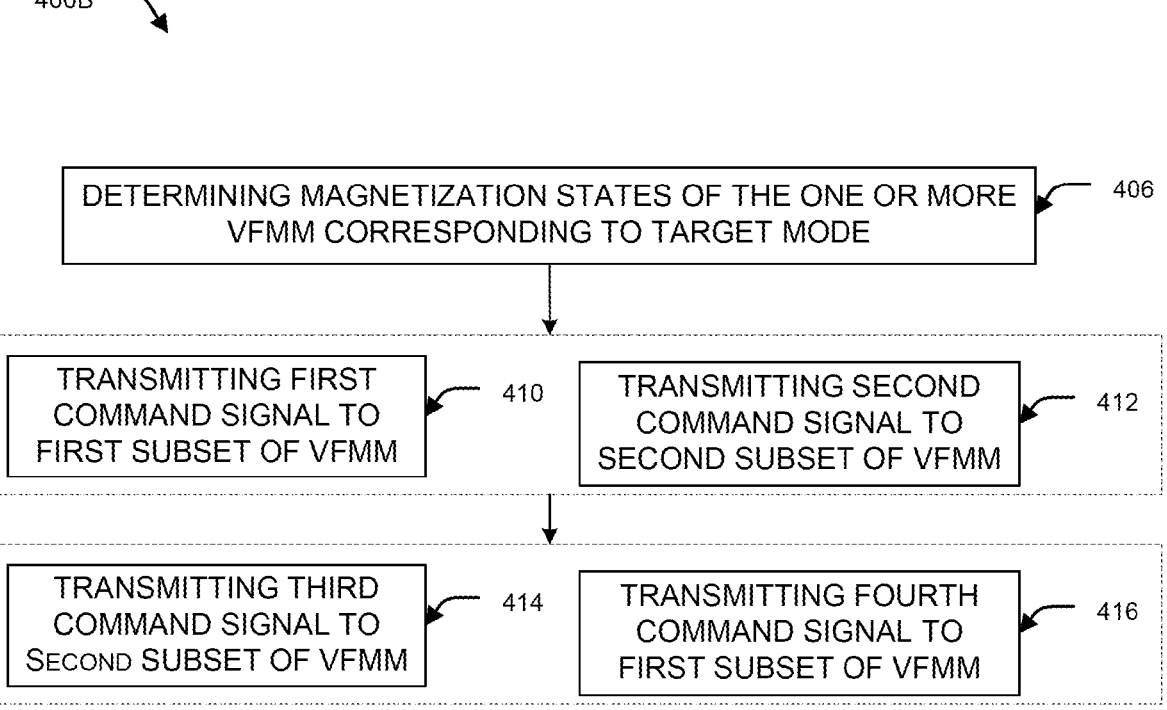
FIG. 4B shows a flowchart of a method for asynchronous switching of magnetization states of each VFMM, according to one or more embodiments.

FIG. 4B shows a flowchart of a method (400B) for asynchronous switching of magnetization states of each VFMMs (106), according to one or more embodiments.

At step 410, the method (400B) includes transmitting, by the controller, a first command signal to a first subset of VFMMs from the one or more VFMMs to switch to magnetization states thereof corresponding to the target operation mode.

At step 412, the method (400B) includes transmitting, by the controller, a second command signal to a second subset of VFMMs from the one or more VFMMs to increase power supplied thereto to compensate for decrease in net power output of the one or more VFMMs during switching of magnetization states of the first subset of VFMM. In some embodiments, steps 410 and 412 may be performed simultaneously.

At step 414, the method (400B) includes transmitting, by the controller, a third command signal to the second subset of VFMMs to switch to magnetization states thereof corresponding to the target operation mode. and At step 416, the method (400B) includes transmitting, by the controller, a fourth command signal to the first subset of VFMMs to increase power supplied thereto to compensate for decrease in net power output of the one or more VFMMs during switching of magnetization states of the second subset of VFMM. In some embodiments, steps 414 and 416 may be performed simultaneously.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

The invention claimed is:

1. A system for shifting operational modes of Variable Flux Memory Motor (VFMM) comprising:

at least one VFMM comprising a plurality of operational modes;

at least one interface configured to receive at least one input indicative of at least one of the plurality of operational modes; and a controller configured to:

shift to the at least one of the plurality of operational modes based on the at least one input received from the at least one interface;

transmit a first command signal to switch magnetization state of a first set of VFMMs corresponding to the at least one operational mode of the plurality of operational modes;

transmit a second command signal to increase power of a second set of VFMMs to compensate for a change in net power output during switching of the magnetization states of the first set of VFMMs;

transmit a third command signal to switch magnetization states of the second set of VFMMs corresponding to the at least one operational mode of the plurality of operational modes; and transmit a fourth command signal to increase power of the first set of VFMMs to compensate for a change in net power output during switching of the magnetization states of the second set of VFMMs.

2. The system of claim 1, wherein:

each of the at least one interface comprises a shift knob, a button, a grip shift, a foot pedal, a rotary knob, a voice command receiver, and biomedical implants.

3. The system of claim 1, wherein each operational mode of the plurality of operational modes comprises at least one magnetization state, the at least one magnetization state corresponding with torque power and speed.

4. The system of claim 1, wherein the controller is configured to:

retrieve a set of magnetization states for the at least one VFMM corresponding to the at least one operational mode of the plurality of operational modes; and transmit another command signal to the at least one VFMM to switch magnetization state to the retrieved set of magnetization states.

5. The system of claim 1, wherein the controller is configured to:

determine a set of magnetization states corresponding to the at least one operational mode of the plurality of operational modes in real-time for each VFMM based on the at least one input; and transmit another command signal to switch magnetization states for each VFMM to the determined set of magnetization states.

6. The system of claim 1, further comprising a display configured to indicate the at least one operational mode, at least one torque, and at least one speed of each VFMM.

7. A system for shifting operational modes of variable flux memory motor (VFMM) based on environmental parameters, the system comprising:

at least one VFMM configured to shift to at least one operational mode of a plurality of operational modes;

at least one sensor configured to detect at least one environmental parameter; and a controller configured to:

shift the at least one operational mode of the at least one VFMM to a target operational mode based on the at least one environmental parameter from the at least one sensor;

transmit a first command signal to switch magnetization states of a first set of VFMMs corresponding to the target operational mode;

transmit a second command signal to increase power of a second set of VFMMs to compensate for a change in net power output during switching of the magnetization states of the first set of VFMMs;

transmit a third command signal to switch magnetization states of the second set of VFMMs corresponding to the target operational mode; and transmit a fourth command signal to increase power of the first set of VFMMs to compensate for a change in net power output during switching of magnetization states of the second set of VFMMs.

8. The system of claim 7, wherein each of the at least one sensor is configured to detect the at least one environmental parameter, the at least one environmental parameter being at least one of rain detection parameters, surface friction parameters, temperature parameters, tire pressure parameters, and surface gradient parameters.

9. The system of claim 7, wherein each operational mode of the plurality of operational modes corresponds to at least one magnetization state for each VFMM, each magnetization state indicative of a torque power and a speed.

10. The system of claim 7, wherein the controller is configured to:

retrieve a set of magnetization states corresponding to the target operational mode for the at least one VFMM; and transmit another command signal to switch magnetization states of the at least one VFMM to the retrieved set of magnetization states.

11. The system of claim 7, wherein the controller is configured to:

determine a set of magnetization states corresponding to the target operational mode in real-time for each VFMM from the at least one VFMM; and transmit another command signal to switch magnetization states of the at least one VFMM to the determined set of magnetization states.

12. The system of claim 7, further comprising at least one interface configured to receive at least one input.

13. A method for shifting operational mode of Variable Flux Memory Motor (VFMM), the method comprising:

providing at least one VFMM coupled with a controller configured to operably shift an operational mode of the at least one VFMM based on a signal;

receiving, by the controller, a set of signals from at least one of one or more interfaces and/or one or more sensors to shift a target operational mode of the at least one VFMM;

determining, by the controller, a set of magnetization states of each of the least one VFMM corresponding to the target operational mode; and transmitting, by the controller, a set of command signals to each VFMM of the at least one VFMM to shift the corresponding operational mode, wherein the step of transmitting comprises:

transmitting, by the controller, a first command signal to switch magnetization states of a first set of VFMMs corresponding to the target operational mode;

transmitting, by the controller, a second command signal to increase power of a second set of VFMMs to compensate for a change in net power output during switching of magnetization states of the first set of VFMMs;

transmitting, by the controller, a third command signal to switch magnetization states of the second set of VFMMs corresponding to the target operational mode; and transmitting, by the controller, a fourth command signal to increase power of the first set of VFMMs to compensate for a change in net power output during switching of magnetization states of the second set of VFMMs.

14. The system of claim 2, wherein the controller is configured to determine the at least one operational mode selected from the at least one input received from the at least one interface.

15. The system of claim 4, further comprising a database configured to include the set of magnetization states for each operational mode of the plurality of operational modes.

16. The system of claim 8, wherein the controller is configured to determine the target operational mode based on the at least one environmental parameter received from the at least one sensor.

17. The system of claim 12, wherein the controller is configured to determine the target operational mode based on the at least one input and the at least one environmental parameter.

* * * * *